Dec. 22, 1931.  G. H. JACOBS  1,837,662
BIRD FORM
Original Filed June 14, 1929
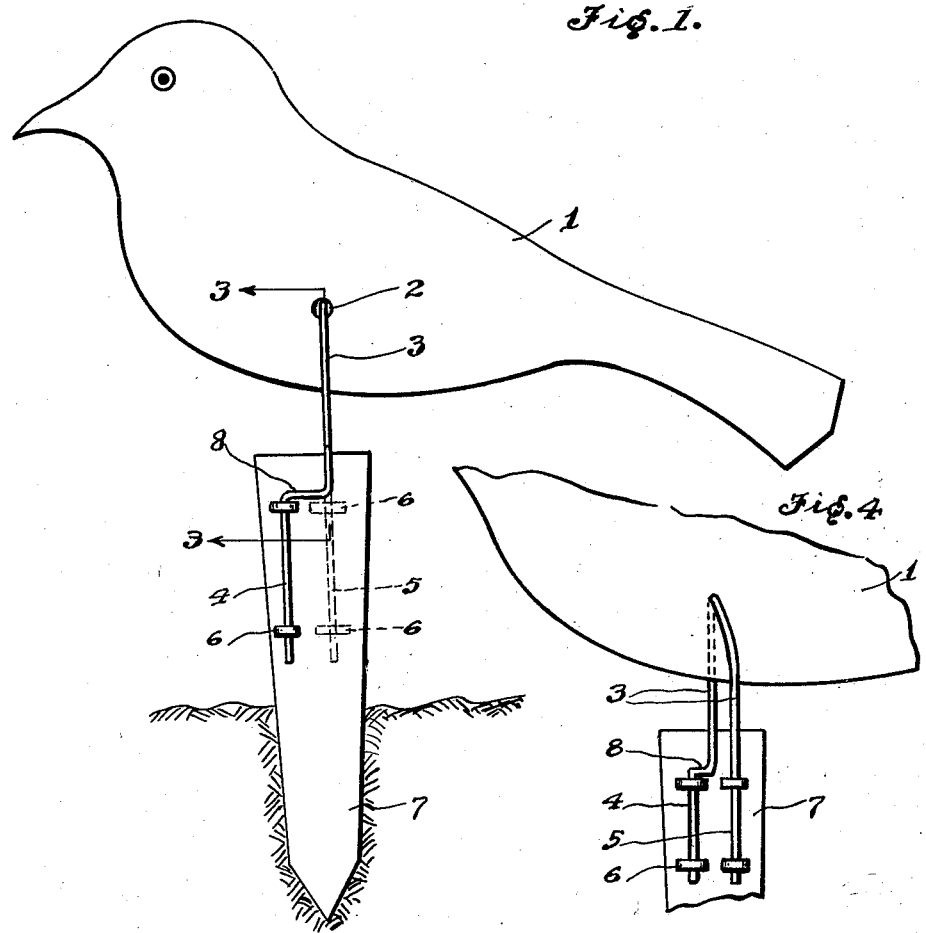
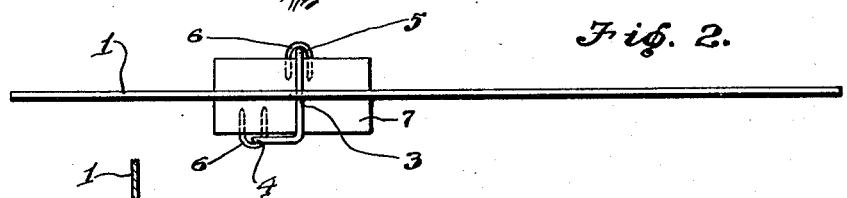
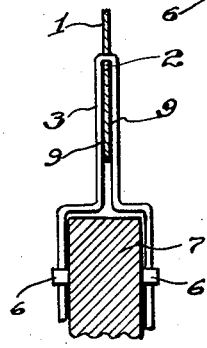
INVENTOR.
George H. Jacobs
BY
O. E. Howe
ATTORNEY.

Patented Dec. 22, 1931

1,837,662

UNITED STATES PATENT OFFICE

GEORGE H. JACOBS, OF POMONA, CALIFORNIA

BIRD FORM

Application filed June 14, 1929, Serial No. 370,982. Renewed October 12, 1931.

This invention relates to bird forms such as used to decorate lawns, yards and grass plots.

The principal object of the invention is to construct a device of this nature which will be similar in appearance to a bird, retain its shape in all out door atmosphere and provided with means to retain the structure in the ground.

Another object of the invention is to provide a weatherproof bird form having means to be detachably fastened to position by staples to a stake driven in the ground.

Still another object of the invention is to construct a device of this nature having wire legs detachably supported by staples on a stake in the ground and an offset portion in one of the legs for positioning the structure in its proper place on the stake.

Other objects will appear as the disclosure progresses. The drawings are intended merely to indicate a possible embodiment of the invention. It is obvious that the actual needs of manufacture may necessitate certain mechanical changes. It is therefore not intended to limit the invention to the embodiment illustrated but rather to define such limits in the appended claim. For a more general understanding of the invention attention is now called to the drawings in which a preferred embodiment is illustrated. In these drawings like reference characters denote like parts throughout the specification.

Figure 1 is a side view of the complete device showing it attached to a stake driven in the ground.

Figure 2 is a top view thereof.

Figure 3 is a section on line 3—3 of Figure 1.

Figure 4 is a modified form of the device.

Referring now to the drawings in detail numeral 1 designates the body portion cut from sheet metal and having a profile in the form of a bird. Drilled in the body portion is a hole 2 through which passes a wire 3 for supporting the form. The wire is provided with downwardly bent legs 4 and 5 which fit in staples 6 driven in the stake 7. One of the leg 4 is provided with an offset portion 8 which rests on its co-operating staple and correctly positions the bird form in relation to the stake.

The legs 4 and 5 fit loosely in the staples so the form can easily be removed or replaced. In order to prevent the form from oscillating on its support the portion of the legs which are adjacent the form are soldered thereto as at 9. The stake 7 is made from wood or the like and is wedge shaped at the bottom so it can be easily driven in the ground.

It will thus be seen that I have provided an attractive ornament for decorating and improving the appearance of lawns, yards or other grass plots. The device is simple, inexpensive and can easily be fastened in place.

Having described my invention, I claim:—

In a device of the class described, the combination of a body portion cut in the shape of a bird, of a supporting member for same, said supporting member made from one piece of wire bent in the middle and forming two legs, the bent portion of the supporting member passing through a hole in the said body, said legs disposed parallel to each other, an offset portion in one of the legs, a stake having staples attached thereto to receive the ends of said legs, said offset portion resting on one of said staples.

In testimony whereof I affix my signature.

GEORGE H. JACOBS.